United States Patent [19]

Pattarozzi

[11] Patent Number: 4,551,052
[45] Date of Patent: Nov. 5, 1985

[54] DEVICE FOR FORMING, FROM THE TOP DOWNWARDS, ARTICLES INTO A STACK OF ORDERLY LAYERS

[75] Inventor: Domenico Pattarozzi, Bologna, Italy

[73] Assignee: B.S.P. Packaging Systems di Pattarozzi D. & C.s.a.s., Bologna, Italy

[21] Appl. No.: 531,662

[22] Filed: Sep. 13, 1983

[30] Foreign Application Priority Data

Sep. 16, 1982 [IT] Italy .................................. 3533 A/82

[51] Int. Cl.[4] ............................................ B65G 57/06
[52] U.S. Cl. ........................................ 414/81; 74/435; 414/80
[58] Field of Search ..................... 74/435 X, 436, 820; 414/76, 77, 81, 80

[56] References Cited

U.S. PATENT DOCUMENTS

| | | | |
|---|---|---|---|
| 2,868,032 | 1/1959 | Miller | 74/436 |
| 2,918,828 | 12/1959 | Dexter | 74/436 |
| 3,837,140 | 9/1974 | Golantsev et al. | 414/80 X |
| 4,183,704 | 1/1980 | Steinhart | 414/81 X |

FOREIGN PATENT DOCUMENTS 2831084 2/1979 Fed. Rep. of Germany ........ 414/77
2121647 8/1972 France .
1576656 10/1980 United Kingdom .

Primary Examiner—Robert J. Spar
Assistant Examiner—Janice Krizek
Attorney, Agent, or Firm—Stevens, Davis Miller & Mosher

[57] ABSTRACT

A stacking device for articles to be contained that comprises a first station placed downstream of a longitudinal article infeed line, and a second station, downstream with respect to the former, connected to a horizontal plate. The second station comprises two longitudinal rollers, each of which is provided with a longitudinal flat part in the region of which is locked a longitudinal sustaining strip. With the rollers in the non-operative position, the two sustaining strips are side by side and define a channel for receiving the articles coming from the first station. Inside the channel, sensors are provided for detecting the formation of one layer of articles placed transversely side by side. Once one layer has been seen to have been formed, the rollers complete one full revolution in counter rotating directions and either transfer the layer onto the underneath plate or onto the topmost layer of the stack under formation thereon, the transverse sides of which are guided vertically, and the longitudinal sides of which are guided and/or aligned vertically.

11 Claims, 14 Drawing Figures

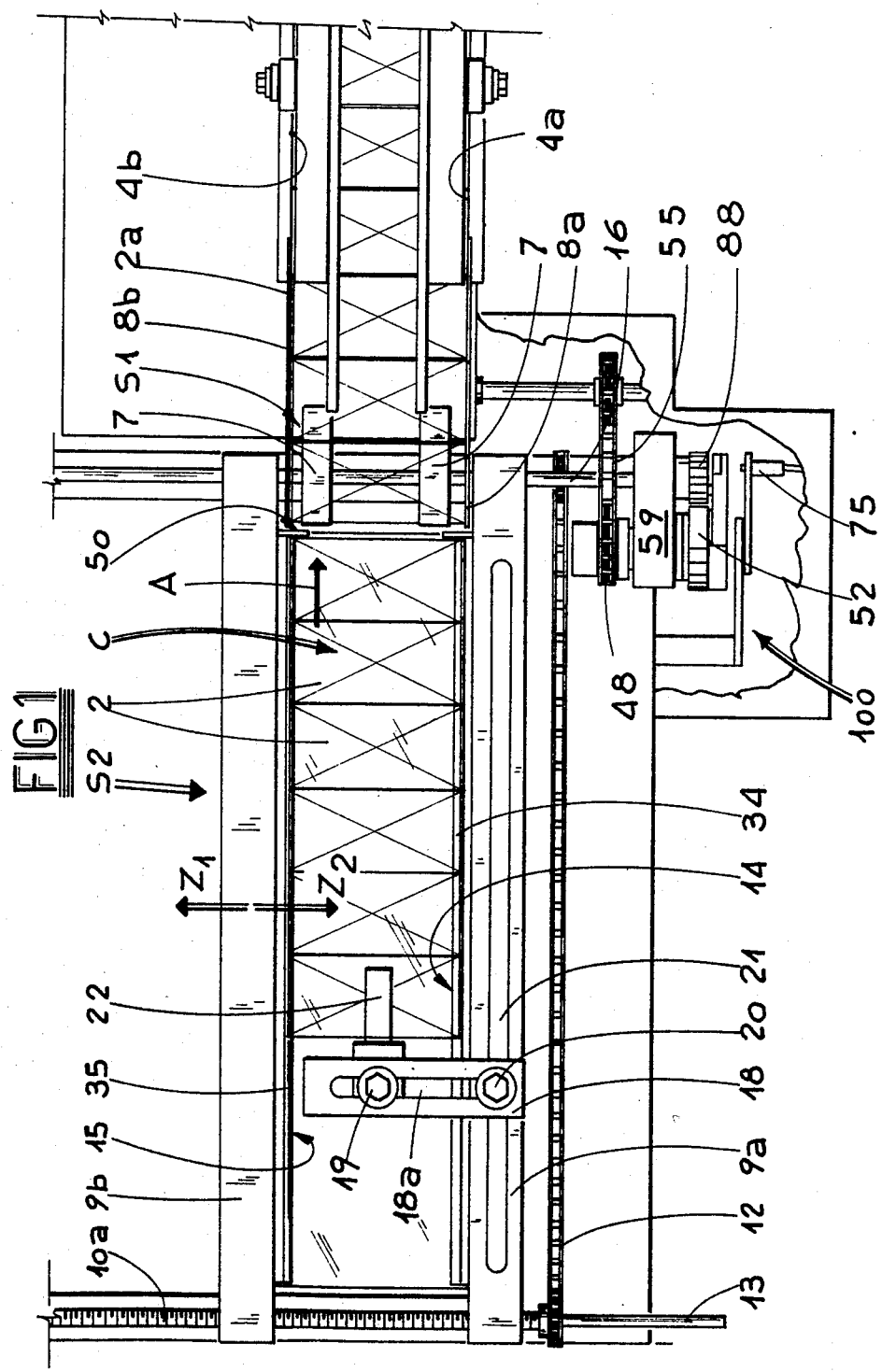

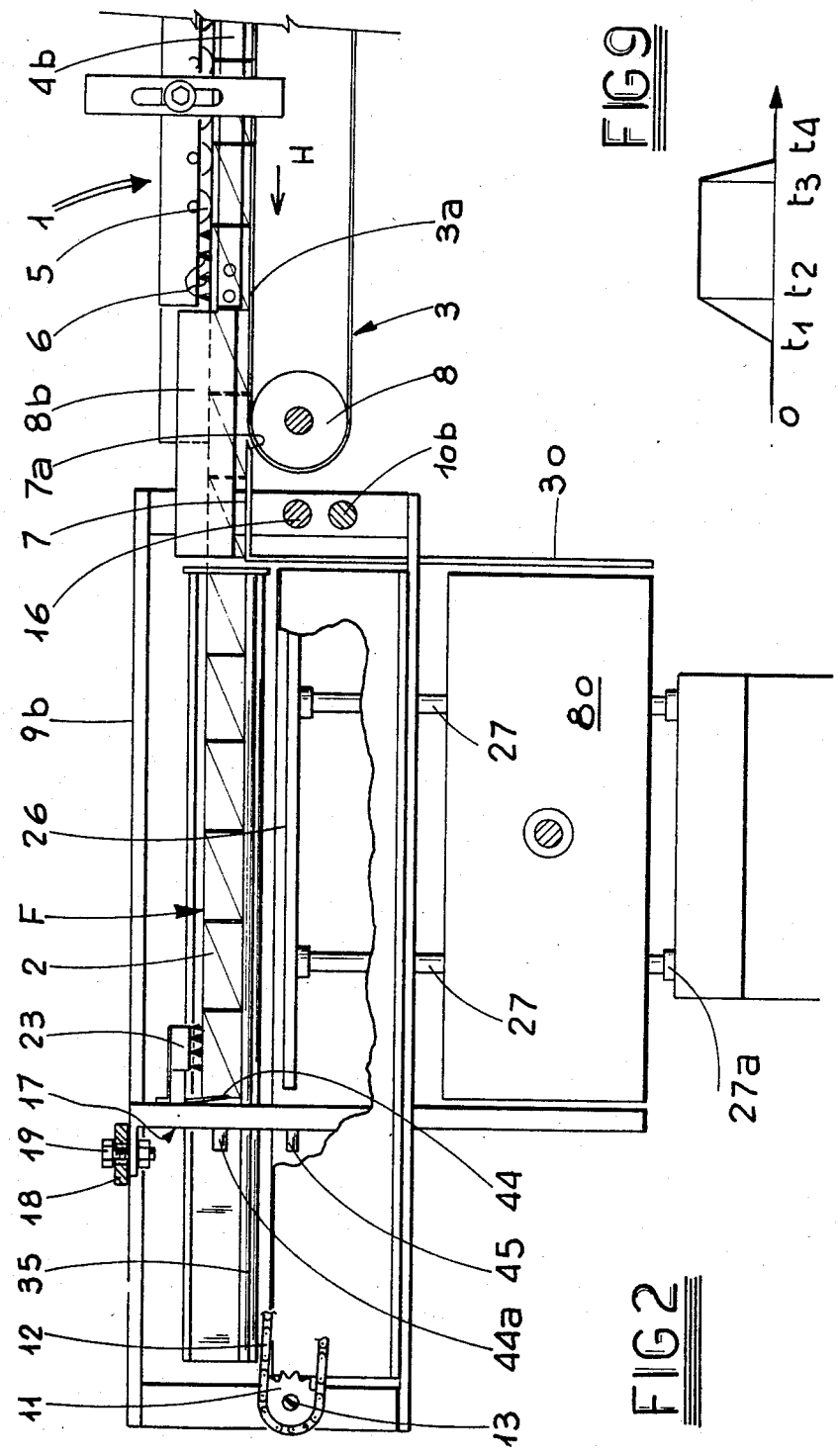

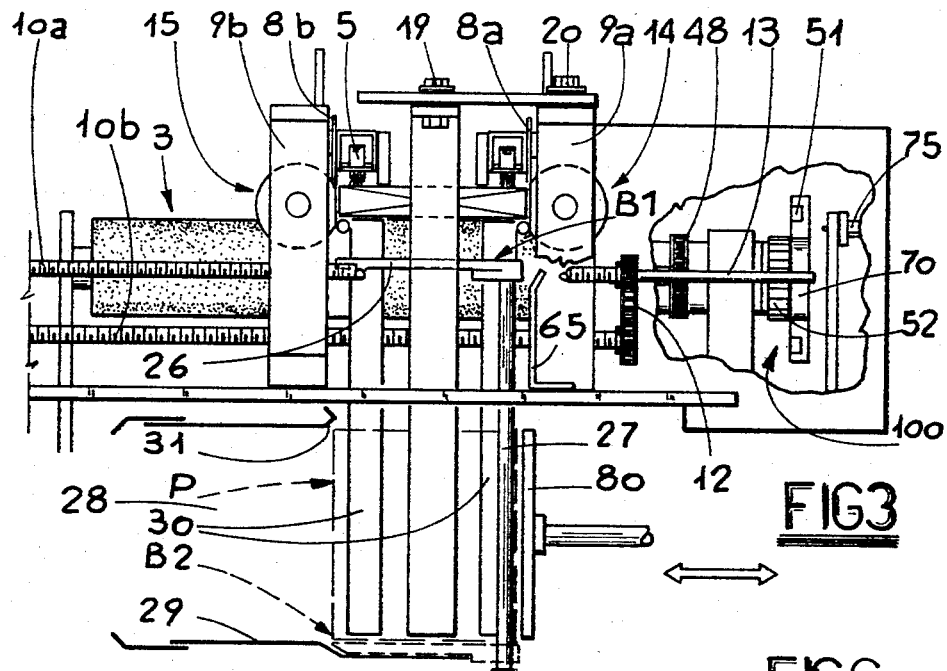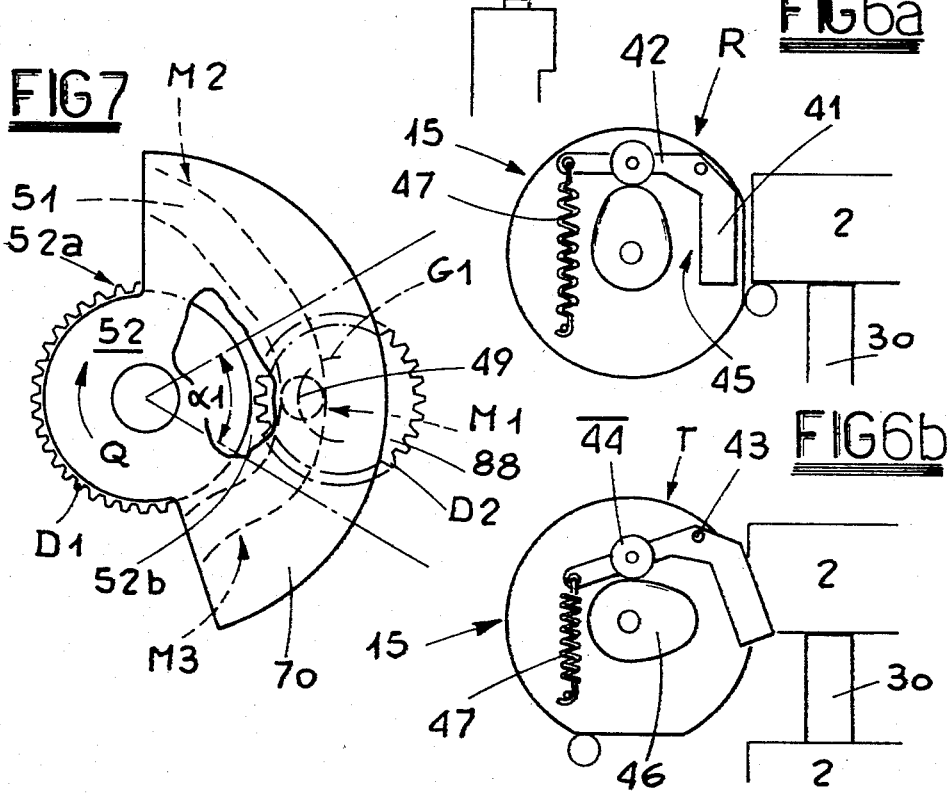

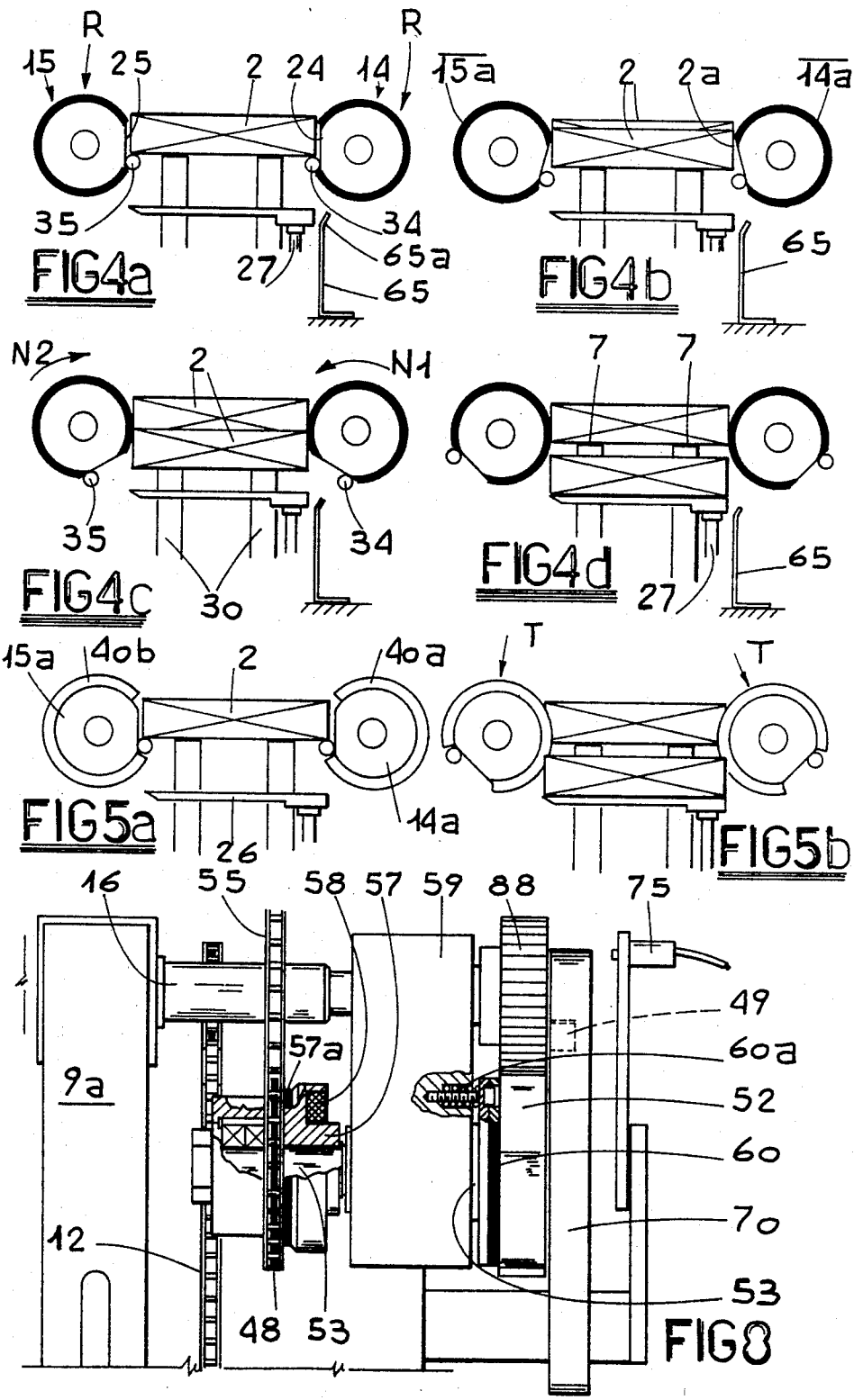

DEVICE FOR FORMING, FROM THE TOP DOWNWARDS, ARTICLES INTO A STACK OF ORDERLY LAYERS

BACKGROUND OF THE INVENTION

The invention relates to a device for forming, from the top downwards, articles into a stack of orderly layers.

DESCRIPTION OF THE PRIOR ART

In U.S. Pat. No. 4,414,789, a line for infeeding identically oriented articles; a station, placed downstream of the said line, destined to form one layer of articles placed transversely side by side; sensor devices for detecting one complete layer formed in the station; movable means, connected to the station, able to adopt two extreme configurations for supporting and guiding the articles in the layer under formation and, following a predetermined force being applied, from the top downwards, onto the means, for releasing the layer, respectively; a support plate, placed beneath the movable means, movable vertically between an upper extreme and a lower extreme position, one spaced away from the other by a multiple of the height of the layer, the former immediately underneath the movable means and the latter coplanar with the base of a station for filling a container, the plate being destined to receive intermittently the layers formed in the station; and a presser movable in a vertical reciprocating fashion between two extreme cyclic positions, namely a non-operative and an operative position, spaced apart at a distance that can be set, the non-operative position being beneath the layer under formation and the operative position beneath the support base defined by the movable means when in the article support and guide configuration.

Once a layer is seen to have been formed, the presser moves downwards vertically and interrupts the layer that was discharged onto the plate because the vertical force pressing down onto the layer causes the movable means to adopt the release configuration; the action of the presser on the layer placed on the plate results in the latter undergoing a downward displacement in the same direction. In this way, a stack of identically oriented superposed layers was formed on the plate.

In the solution to which reference has just been made, the action of the presser caused, first of all, the release of the layer on the part of the movable means and, subsequently, the downward movement of the plate; this was responsible for an action of compression (however slight it may be) on the articles and for the layer "jumping" (though negligibly) from the movable means onto the underneath plate (or onto the topmost layer of the stack under formation thereon).

SUMMARY OF THE INVENTION

The object of the invention is to provide a device that, first of all, forms an orderly layer of articles placed transversely side by side and then gently transfers the formed layer either onto an underneath plate or onto the topmost layer of the stack under formation thereon, without the articles being subjected to vertical compression, and without the aid of presser or pusher members, with everything being done at a high output speed with optimal results as regards the stability of the stack under formation.

Another object of the invention is to provide an extremely versatile, or indeed universal, device able to handle articles of any size.

The above mentioned objects are achieved with the device according to the invention for forming, from the top downwards, articles into a stack of orderly layers, of the type that comprises a longitudinal line for infeeding the said identically oriented articles, and a horizontal plate movable vertically between two extreme positions, namely an upper and a lower position, both positioned beneath the horizontal support base of the line, and wherein there is: a first station, placed downstream of the line, destined to receive from the latter, the articles without varying the elevation or the orientation thereof; and a second station that cooperates with the aforementioned plate, is placed downstream of the first station and is destined to form, with the articles forthcoming from the latter, one longitudinal layer of articles placed transversely above the upper extreme position of the plate, and subsequently to transfer the layer either onto the underneath plate or onto the topmost layer of the stack under formation thereon, without altering the orientation or the horizontal arrangement of the transferred layer.

In greater detail, the second station comprises: two identical side by side rollers that extend, commencing at the first station, longitudinally at the same elevation in such a way as to be positioned with the facing surfaces thereof away from one another at a distance no less than the transverse dimension of the articles; means for intermittently driving, at the same instantaneous speeds, the said rollers in counter-rotating directions between identical non-operative positions, each of which reached from the preceding one through one revolution of the rollers; two longitudinal sustaining strips, each locked externally to a corresponding roller and having one extremity in the region of the first station, the said sustaining strips defining, with the rollers in the non-operative position, a horizontal channel for receiving the articles coming from the first station and for supporting the lower longitudinal edges of those at an elevation coplanar with the support base of the first station; sensor means for detecting the formation of one layer in the channel and for subsequently setting the drive means in operation; sensor means for detecting the non-operative position of the rollers following the transfer of one layer of articles onto the plate, or onto the topmost layer of the stack under formation thereon; movable position locator means situated in proximity of the vertical separation plane of the first and of the second station, subjected to the rollers and able to adopt two characteristic positions of non-interception and of interception of the first article in the row of articles present in the first station, respectively, in corresponding synchrony with the non-operative and the operative position of the said rollers; means for regulating the longitudinal extension of the layer under formation in the channel; means for regulating the distance the rollers are apart; means for guiding vertically the transverse sides of the stack under formation on the plate; means for aligning and/or guiding vertically the longitudinal sides of the stack; and sensor devices for operating the vertical drive means of the plate interdependently connected to the drive means of the rollers.

In particular, each of the rollers is provided externally with a longitudinal flat part in the region of which is locked the corresponding sustaining strip, and when the rollers are in the non-operative position, the flat parts are vertically apart at a distance one from the other no less than the transverse dimension of the articles, defining a longitudinal guide for the longitudinal sides of the articles present in the channel. Furthermore, the curved longitudinal surfaces of the said rollers are faced with a layer of pliable elastic material. In this way, once the rollers are made to counter-rotate, the sustaining strips are lowered and, contemporaneously, move away, while the curved lateral surfaces of the rollers "bite elastically" the longitudinal sides of the articles which are transferred onto the underneath plate in a continuous fashion, that is to say, without the articles dropping, with everything being done without the aid of pusher members, cams or elastic means.

BRIEF DESCRIPTION OF THE DRAWINGS

Emphasis is given hereinafter to the characteristics of the device according to the invention, with reference to the accompanying tables of drawings, in which:

FIG. 1 shows the device in question in plan view.

FIG. 2, shows the device in a lateral view with / some parts removed in order that others may become more visible.

FIG. 3 shows the device in question and in a front view with some parts removed;

FIGS. 4a, 4b, 4c and 4d show, diagrammatically, with respect to FIG. 3, certain moments in the transfer of one layer from the sustaining strips to the plate;

FIGS. 5a and 5b show, in the direction A in FIG. 1, the locator means in two characteristic positions;

FIGS. 6a and 6b show a variant for the said locator means, in two characteristic positions;

FIG. 7 shows, in a front view, the drive means for the two rollers;

FIG. 8 shows in a cross sectional view, the drive means for the two rollers,

FIG. 9 shows, as a function of time, the angular velocity behavior of the wheel driven by the said means.

DESCRIPTION OF THE PREFERRED EMBODIMENT

With reference to the figures, at 1 has been shown a line for infeeding articles 2 (for example: parallelepiped packages) of identical orientation. The line comprises a conveyor belt 3 (the upper portion 3a of which traverses in the direction H), a pair of longitudinal walls 4a,4b (that define a guide for the transverse sides 2a of the articles), idle rollers 5 (supported in a known fashion) cooperating with the portion 3a of the belt conveyor 3 in order to move the articles 2 along, and brushes 6 destined to slow down the movement of the latter in the region of a first station S₁ positioned downstream of the line 1.

The station S₁ is constituted by two blocks 7 (one parallel with the other), in the same plane as the portion 3a of the conveyor belt 3 and the sides 7a facing conveyor belts are bent in a way complementary to the curvature of the conveyor belt 3 given by the extremity roller 8 around which it is wound, and by two walls 8a,8b whose facing surfaces are perpendicular to the portion 3a of the conveyor belt 3 and aligned with the facing surfaces of the walls 4a,4b, respectively.

From the foregoing it ensues that the articles 2 are transferred from the line 1 to the station S₁ without the transfer altering either the elevation or the orientation of the articles. Downstream of the station S₁ a station S₂, described below, is provided.

Provided in the station S₂ are two box shaped support casings 9a,9b that are positioned longitudinally and are open in the region of the facing's longitudinal walls. The casing 9a is stationary while the casing 9b is rendered transversely movable in the directions $Z_1, Z_2$ by means of two threaded shafts (or screws) 10a,10b, the rotation of which is synchronous thanks to the presence of two identical pinions 11 keyed correspondingly on the same shafts with which a chain 12 engages. By causing the shaft 10a to rotate (through one extension 13 thereof), it is possible to vary continuously the transverse distance the said casings 9a,9b are apart. The casings support rotatably corresponding longitudinal rollers 14,15 (the sides 14a,15a of which are positioned in the region of the station S₁) provided with longitudinal flat parts 24,25, to each of which is locked (in a way that is known) a sustaining strip 34,35 which, commencing at the plane of separation between the stations S₁ and S₂, extends longitudinally.

In proximity of the sides 14a,15a, the rollers 14,15 are coupled to transmission means (not illustrated since of a known type) to which motion is given by one and the same bar 16 that is driven by the means 100, more about which will be said below. In this way the rollers counter-rotate (directions $N_1, N_2$) at identical instantaneous speeds. The means 100 drive intermittently the rollers 14,15 between consecutive non-operative / positions R, each of which is reached from the preceding one through one revolution of the rollers. In the non-operative position R, the surfaces 24,25 face each other, the distance they are apart being no less than the transverse dimension of the articles 2. When in that position, the sustaining strips 34,35 define a horizontal channel C for receiving the articles arriving from the station S₁ and are coplanar with the support base of the station S₁, supporting the lower longitudinal edges of the articles 2.

Provided in between the sustaining strips 34,35 there is a column 17 secured in a removable fashion to a transverse arm 18 through known locking elements 19 which, in cooperation with a transverse slit 18a made in the arm 18, enables the transverse position of the column to be adjusted continuously. The arm 18 is cantilevered in a removable fashion to the casing 9a through known locking elements 20 which, in cooperation with a slit 21 machined in the casing 9a, enables the longitudinal position of the arm to be adjusted continuously. It can be seen from the foregoing that the position of the column 17 can, therefore, be altered transversely and longitudinally. The column 17 has cantilevered to it, a longitudinal arm 22 that carries a brush 23 so positioned as to intercept the first article in the layer F under formation on the sustaining strips 34,35. A flexible blade shaped element 44, the tripping of which on the part of the first article in the layer F, causes an inductive sensor device 44a connected to the means 100 to be set in operation, is integral with the column 17. Beneath the blade shaped element 44 is placed a photocell 45. More about the positioning and the function of the photocell will be said hereinafter.

Below the sustaining strips 34,35 (with respect to the non-operative position R) is placed a horizontal plate 26 carried by rods 27 that slide in corresponding cylindrical housings 27a. The plate and rods are rendered movable vertically (by known non-illustrated means interlocked to the photocell 45) between the two extreme positions, namely an extreme upper position B₁ and an extreme lower position B₂ (shown with dashes), the latter coplanar with the base of a tubular element 28 (on a horizontal axis), the side of which turned towards the position B$_2$ is constituted by fins 29 that define a funnel.

The forward transverse side of the plate 26 grazes two vertical blocks 30 that join perpendicularly with the corresponding horizontal blocks 7, while the other transverse side skims over the inner surface of the column 17.

The transverse dimension of the plate 26 is practically identical to the distance in between the flat parts 24,25 when in the non-operative position R.

The longitudinal side of the plate 26 turned towards the roller 14 glides over the vertical longitudinal surface of a fixed wall 65 positioned immediately underneath the roller 14 with the upper extremity 65a thereof bent outwardly. The other longitudinal side of the plate 26 passes lightly over a projection 31 made in the upper edge of the top horizontal fin 29.

In a position slightly inwards with respect to the vertical plane separating the stations S$_1$ and S$_2$, locator means 50 are provided. Two embodiments are envisaged (see FIGS. 5a,5b and 6a,6b).

In the first embodiment (FIGS. 5a,5b), the said means 50 take the form of two spherical sectors 40a,40b provided on the circumferential edges of the sides 14a,15a of the rollers 14,15 and extending for a distance such as to define, jointly with the rollers in the non-operative position R, a seat for the articles 2 to pass freely from station S$_1$ to station S$_2$ (FIG. 5a).

When the rollers 14,15 rotate in directions N$_1$,N$_2$ (transfer position T, FIG. 5b, for one layer onto the underneath plate 26), the sectors 40a,40b intercept the side of the first article 2 in the row of articles present in the station S$_1$ (FIG. 5b).

The solution to which reference has just been made is suitable for articles 2 of a predetermined cross section, while that illustrated in FIGS. 6a,6b is universal, that is to say, suitable for any type of article.

With reference to FIGS. 6a,6b, at 45 has been shown an element oscillating along the vertical plane separating the stations S$_1$ and S$_2$, constituted by two arms, namely an internal arm 41 and an external arm 42, pivoted at 43 to a fixed support. Mounted idly on the arm 42 there is a roller 44 that revolves constantly, under the action of a spring 47, on a cam 46 keyed to the roller 15. Similar elements are obviously connected to the other roller 14. With the roller 15 in position R, the cam 46 keeps the arm 41 outside the path followed by the articles 2 from station S$_1$ to station S$_2$. When, instead, the roller 15 is in the T position, the arm 41 is positioned along the said path and, in this way, intercepts the side of the first article in the row of articles present in the station S$_1$.

The aforementioned means 100 are illustrated in FIGS. 7 and 8.

A pinion 48 (kept in constant rotation by a chain 55) is loosely mounted on a shaft 53 (parallel to the bar 16) supported centrally and rotatably by a fixed structure 59. The shaft 53 has keyed to it an electromagnet 57 provided with an annular clutch disk 57a in contact with one side of the pinion 48. The excitation of the coil 58 of the electromagnet (caused by the operation of the inductive sensor 44a) brings about the closed positioning (with pressure) of the disk 57a against the side of the pinion 48, in which case the shaft 53 is carried in rotation. On the side of the electromagnet opposite to the pinion 48 with respect to the structure 59, is fixedly mounted on shaft 53 a cogged drive wheel 52 whose inner side is constantly subjected to the action of a fixed annular clutch disk (or brake) 60 pressure maintained against the side by one or more springs 60a.

In the circumferential extension of the wheel 52, two parts 52a and 52b can be seen, the former provided with teeth D$_1$ and the latter toothless. The part 52a is destined to mesh with a cogged driven wheel 88 (provided with teeth D$_2$ numerically greater than the teeth D$_1$) which loosely supports, in the region of one side thereof, a roller 49 eccentric with respect to the axis of the wheel 88. The said roller is freely inserted in a cam type groove 51 machined in a sector 70 integral with one side of the wheel 52 and protruding radially there from in the region of the part 52b.

The profile of the cam 51 gives the roller a central waiting area M$_1$, an exit area M$_2$ destined (since the wheel 52 rotates in the direction Q) to accelerate the wheel 88, and an entry area M$_3$ destined to decelerate the wheel 88.

The non-operative condition for the wheels 52 and 88 is illustrated in FIG. 7 and, for the rollers 14,15, this causes them to adopt the position R.

The excitation of the coil 58 of the electromagnet 57 results in the wheel 52 being carried in rotation and causes, for the wheel 88, the angular velocity to be as per the graph in FIG. 9.

As long as the roller 49 is in the area M$_1$, the wheel 88 is at a standstill (section o-t$_1$) thereby defining the non-operative position R for the rollers 14,15. When the roller 49 is in the area M$_2$, the wheel 88 accelerates gradually until the maximum speed is reached (section t$_1$-t$_2$): it should be noted that the meshing one with the other of the wheels 52 and 88 occurs prior to the roller 49 leaving the area M$_2$. With the wheels 52 and 88 meshing, the speed remains constantly at the maximum value (section t$_2$-t$_3$). As soon as the roller 49 passes into the area M$_3$, the deceleration of wheel 48 takes place until zero is reached in the area M$_1$ (section t$_3$-t$_4$). With the roller 49 in the region of the area M$_1$, the front radial side of the sector 70 is located on the axis of an inductive sensor device 75 and, on the part of this, the de-energizing of the coil 58 is caused. It should be noted that the area M$_3$ is relatively short so that the detection time of the sensor device 75 and the de-energizing time of the coil 58 carry the roller definitely into the area M$_1$. The roller 49 stays in the area M$_1$(which presses down on an angle at the center $\alpha_1$) since the mechanical energy of the rotating masses of the means 100 is dissipated in heat by the brake 60 that exerts an effect on one side of the wheel 52.

The fact of having the area M$_1$ press down on an angle at the center $\alpha_1$ makes it possible, also jointly with the action of the brake 60, to halt the rollers 14,15 simultaneously in the position R. The position is stable since the trajectory of the roller 49 along the line G$_1$ is obstructed by the outer lateral surface of the cam 51.

A description now follows of the operation of the device according to the invention, with the plate 26 assumed to be initially in the position B$_1$.

With the rollers 14,15 in the position R (FIG. 4a), the articles 2 cross, thrust forward by the conveyor belt 3, the station S$_1$ in order to be received by the station S$_2$ or, more precisely, by the channel C.

A layer F of transversely side by side articles forms in the channel and this is because the braking effect exercised by the brush 23 on the leading article prevents empty spaces being created in between the articles in the layer.

The interception of the blade shaped element 44 on the part of the leading article in the layer trips the sensor device 44a enabling the coil 58 to be excited.

The rotation of the bar 16 (at the angular velocity shown in FIG. 9) causes the rollers 14,15 to rotate in the opposite directions $N_1, N_2$ and the effect of this is that the locator means 50 are immediately set in operation to locate the leading article in the row of articles present in the station $S_1$ (FIG. 5a or 6b).

One full revolution on the part of the rollers 14,15 causes the layer F to be transferred from the sustaining strips 34,35 that define the channel C, onto the underneath plate 26, as illustrated diagrammatically in FIGS. 4a, 4b, 4c and 4d.

At this juncture it is necessary to point out that, in one preferred embodiment, the lateral surfaces of the rollers 14,15 (with the exception of the corresponding flat part 24,25 thereon) are faced with layers 14a,15a of resilient material. In this way, before the sustaining strips 34,35 (that lower and contemporaneously move away) are positioned externally to the longitudinal sides 2a of the articles 2, the said resilient layers 14a,15a "bite" (deforming elastically) the relevant longitudinal sides 2a of the articles. This is particularly advantageous for two reasons: the first and most important reason being that the layer F is transferred delicately from the sustaining strips 34,35 onto the plate 26 without the articles in the layer suffering any dropping action; the second reason being that the layers 14a,15a press down on the articles (FIG. 4d) even after the transfer has taken place and enable the layers F to be compressed (obviously in a number at least equal to two) on the plate 26, with the consequent recovery of the harmful vertical spaces that form in between one layer and another during the formation of the stack P.

The operation of the sensor device 75 in order to de-energize the coil 58 completes the rotation in one full revolution of the rollers 14,15 which, on account of what has been stated previously, move once again simultaneously into the position R which enables a fresh layer F to be formed.

Upon completion of the transfer of one layer F, non-illustrated means destined to cause the plate 26 to undergo downward displacement, are set in operation in a known fashion. The means continue to operate until the photocell 45 has been obscured, or in other words, until the top surface of the layer F transferred onto the plate 26 is at the same horizontal elevation as the photocell.

In an identical fashion, a succession of layers are placed on the plate 26 until a stack P has been formed.

During the intermittent downward displacements of the plate 26, the transverse sides of the stack are guided by the blocks 30 and by the column 17, respectively. The longitudinal side of the stack turned towards the roller 14 is aligned vertically in consequence of the contact there with of the upper extremity 65a of the wall 65 and, during the downward displacements, is also guided vertically by the wall 65. The other side of the stack is also aligned vertically in consequence of the contact there with of the longitudinal projection 31 provided in the top fin 29 of the element 28. The stack is complete once the plate 26 arrives in the position $B_2$. At this stage, a lateral pusher member 80 thrusts the stack P first of all into the inside of the element 28 and then, in cooperation with this (as described in the previously mentioned U.S. Pat. No. 4,414,789), takes the necessary action to insert the said stack into a corresponding (non-illustrated) container.

It is obvious that in the event of the articles 2 not tolerating any transverse compression, the distance between the flat parts 24,25 and the way in which the sustaining strips 34,35 are dimensioned must be such as to cause the layer F to drop (though lightly) onto the plate 26.

From the foregoing description it is quite clear that the device according to the invention is universal, that is to say, suitable for any longitudinal and transverse dimension of the articles 2. If, in fact, the crosswise dimension of the articles varies, action has to be taken to move the casing 9b in direction $Z_1$ or $Z_2$ (and correspondingly to displace in a likewise direction the walls 4b and 8b which could be rendered integral with one another), while for a variation in the longitudinal dimension of the said articles, action has to be taken to displace longitudinally the arm 18 in such a way that the distance between the column 17 and the blocks 30 be at least a multiple of the said longitudinal dimension. Naturally, the arm 18 is moved also to vary the longitudinal dimension of the layer F.

It is understood that the description given above is purely an unlimited example and that eventual variants in the constructional details, therefore, all fall within the technical framework of the foregoing description and of the claims listed hereunder.

What is claimed is:

1. Device for forming, from the top downwards, articles into a stack of orderly layers, comprising a longitudinal line for infeeding oriented identical articles; a support base for said infeeding lines, a horizontal plate movable vertically between two extreme positions, both extreme positions being beneath the horizontal support base of the said line; a first station means, placed downstream of the said line to receive from the line the said articles without varying the elevation or the orientation thereof; a second station means that cooperates with the aforementioned plate downstream of the first station, said second station means forming with the articles forthcoming from the first station means, one longitudinal layer of articles placed transversely above the upper extreme position of the said plate, and means to transfer the said layer either onto the plate or onto the topmost layer of the stack under formation thereon, without altering the orientation or the horizontal arrangement of the said transferred layer, said second station means comprises two identical side by side rollers that extend, commencing at the first station means, longitudinally of the line at the same elevation in such a way as to be positioned with the facing surfaces thereof away from one another at a distance no less than the transverse dimension of the said articles, said rollers having operative and non-operative positions; said transfer means intermittently driving, at the same instantaneous speeds, the said rollers in counter-rotating directions between identical stationary non-operative positions, each of which is reached from the preceding one through one revolution of the said rollers, the operative position being when the rollers are driven between the non-operative positions to transfer said layer either onto the plate or onto the topmost layer of the stack under formation thereon; two longitudinal sustaining strips, each locked externally to a corresponding roller and having one extremity in the region of the first station, the said sustaining strips defining, with the rollers in the non-operative position, a horizontal channel for receiving the articles coming from the first station means and for supporting the lower longitudinal edges of the articles at an elevation coplanar with the support base of the first station means; a first sensor means for detecting the formation of one layer in the said channel and for subsequently setting the said transfer drive means in operation; a second sensor means for detecting the non-operative position of the said rollers following the transfer of one layer of articles to be supported by said plate; movable position locator means situated in proximity of the vertical separation plane of the said first station means and of the said second station means, subjected to the said rollers and able to adopt two characteristic positions of non-interception and of interception of the first article in the row of articles present in the first station means, respectively, in corresponding synchrony with the non-operative and the operative position of the said rollers; means for regulating the longitudinal extension of the layer under formation in the said channel; means for regulating the distance the said rollers are apart; means for guiding vertically the transverse sides of the stack under formation on the said plate; means for aligning and/or guiding vertically the longitudinal sides of the said stack; and sensor devices for operating the vertical drive means of the said plate interdependently connected to the drive means of the said rollers.

2. The device according to claim 1, wherein each of the said rollers is provided externally with a longitudinal flat part in the region of which is locked the corresponding sustaining strip, said rollers when being in the non-operative position, having said flat parts vertically apart at a distance one from the other no less than the transverse dimension of the articles and said rollers defining a longitudinal guide for the longitudinal sides of the articles present in the said channel.

3. The device according to claim 2, wherein the curved longitudinal surfaces of the said rollers are faced with a layer of pliable elastic material.

4. The device according to claim 1, including a bar and unitary velocity ratio means, the said rollers being rendered counter-rotating by said corresponding unitary velocity ratio means operated by said bar perpendicular to the said rollers with it being possible for the rollers to slide, one with respect to the other, transversely between the said bar and the said unitary velocity ratio means, said means for operating the said rollers comprising a fixed structure; a shaft; a pinion, maintained in constant rotation, loosely mounted on said shaft parallel to the said bar and rotatably supported by said fixed structure; electromagnetic means for clutch engaging said shaft with said pinion; a blade shaped element setting in operation said first sensor means and said electromagnetic means, said electromagnetic means being disconnected by said second sensor means for detecting the non-operative position of said rollers; a cogged driven wheel fixedly mounted on the said bar; a roller loosely mounted on one side of the said cogged driven wheel, parallel and eccentric with respect to the axis of said bar; a drive wheel fixedly mounted on the said shaft; a fixed clutch disk, one side of said fixed drive wheel being constantly subjected to the action of said fixed clutch disk, the said fixed drive wheel being provided peripherally with two parts, one having teeth that mesh with the teeth of the cogged driven wheel, and the other devoid of teeth; and a spherical sector keyed to said drive wheel in the region of the toothless part thereof, said sector defining a cam type groove to receive freely said driven wheel roller, said sector extending in such a way as to define a central waiting area for said driven wheel roller as well as for locating the non-operative position of the said two side by side rollers, an exit area linked to the waiting area, to accelerate the driven wheel roller until an equivalence is reached in the angular velocities of the driven wheel and of the drive wheel and, lastly, an entry area linked to said central waiting area, to decelerate the said driven wheel roller down to nil speed, thus defining for the said two side by side rollers, a non-operative position.

5. The device according to claim 1, wherein the said locator means comprise at least one arm that oscillates, in proximity of the vertical plane separating the said two stations, between the characteristic positions thereof, and means for operating the said arm on a time relationship basis with respect to the means that drive the said two side by side rollers.

6. The device according to claim 1, wherein the said locator means are defined by two spherical sectors, positioned in proximity to a vertical plane separating the said two stations, situated on the outside of the said two side by side rollers, and so shaped as to provide, with the said rollers in the non-operative position, a seat for the articles sent towards the said channel to pass freely over, said spherical sectors, when the said rollers are made to counter-rotate, defining abutting surfaces that intercept the first article in the row of articles present in said first station.

7. The device according to claim 1, wherein the means for guiding vertically the transverse sides of the stack under formation on the said plate comprise at least one fixed vertical block placed in the vertical plane separating the said two stations, and positioned laterally with respect to the corresponding transverse side of the said plate, and at least one vertical column whose position can be set both transversely and longitudinally, the inner surface of which is oriented parallel to the said vertical block, placed laterally with respect to the other transverse side of the plate; said means for regulating the longitudinal extension of the layer under formation on the said sustaining strips are constituted by the inner surface of the said column.

8. The device according to claim 5, wherein the means for operating the said oscillating arm comprise a cam fixedly mounted on each of said two side by side rollers; a fixed pin to which is pivoted one extremity of the said arm; a second arm that originates integral with the extremity of the said oscillating arm, in the region of the pivot, oriented towards the said cam; a roller loosely mounted on said second arm; and elastic means that exert an effect on the said second arm and are destined to maintain the said roller in constant contact with the cam.

9. The device according to claim 4, wherein said second sensor means for detecting the non-operative position of the said two side by side rollers is constituted by an inductive sensor mounted on the said fixed structure, so positioned as to be set in operation by the front radial side of the said sector and consequently to disconnect the said electromagnetic clutch engagement means.

10. The device according to claim 1, including a tubular stack receiving element having a base, the base of which is in the same plane as the said plate at the time the plate is in the extreme lower position, the said receiving element having four diverging fins that define a funnel for the said stack; and wherein the said means for aligning and/or guiding vertically the longitudinal sides of the stack comprise a fixed longitudinal wall, the upper extremity of which is bent outwards, positioned laterally with respect to a corresponding longitudinal side of the said plate; and a longitudinal projection provided in the top fin of the said diverging fins, the innermost position of which is contained in a longitudinal vertical plane, external with respect to the other longitudinal side of the said plate.

11. The device according to claim 1, wherein said first sensor means for detecting the formation of one layer in the said channel comprise a flexible blade shaped element for intercepting the first article in the layer under formation in the said channel, and an inductive sensor device that works in conjunction with the said flexible blade shaped element and is tripped by the flexure of said blade, the said sensor device and the said blade shaped element being supported by the means that guides vertically the longitudinal sides of the stack.

* * * * *